(12) United States Patent
Rengarajan et al.

(10) Patent No.: US 8,948,358 B1
(45) Date of Patent: Feb. 3, 2015

(54) MONITORING OF PERSONAL AND BUSINESS USE OF TELEPHONY DEVICES

(71) Applicant: 8x8, Inc., San Jose, CA (US)

(72) Inventors: Raghu Rengarajan, Newark, CA (US); Mehdi Salour, Saratoga, CA (US)

(73) Assignee: 8x8, Inc., San Jose, CA (US)

( * ) Notice: Subject to any disclaimer, the term of this patent is extended or adjusted under 35 U.S.C. 154(b) by 0 days.

(21) Appl. No.: 14/137,403

(22) Filed: Dec. 20, 2013

(51) Int. Cl.
*H04M 15/00* (2006.01)
*H04M 11/00* (2006.01)
*H04L 12/66* (2006.01)
*H04M 3/22* (2006.01)

(52) U.S. Cl.
CPC .................................. *H04M 3/2263* (2013.01)
USPC ................. 379/121.03; 379/114.03; 370/356; 455/405

(58) Field of Classification Search
CPC . H04L 12/14; H04L 12/1428; H04L 12/1439; H04L 12/1457; H04L 12/1471; H04M 15/00; H04M 15/44; H04M 15/49; H04M 15/52; H04M 15/56; H04M 15/66; H04M 15/75; H04M 15/82; H04M 15/8033; H04M 2215/0104; H04M 2215/24; H04M 2215/32; H04M 2215/7435
USPC .................... 379/111, 114.01, 14.03, 114.09, 379/114.21, 121.03, 125, 127.01, 127.05, 379/128, 133; 455/406–408, 445; 370/356
See application file for complete search history.

(56) References Cited

U.S. PATENT DOCUMENTS

| | | | |
|---|---|---|---|
| 6,925,160 B1 * | 8/2005 | Stevens et al. | 379/121.05 |
| 8,107,957 B1 * | 1/2012 | O'Neil et al. | 455/436 |
| 8,300,634 B2 | 10/2012 | Narayanaswamy et al. | |
| 8,401,003 B1 | 3/2013 | Petit-Huguenin et al. | |
| 2002/0042715 A1 * | 4/2002 | Kelley | 705/1 |
| 2009/0061872 A1 * | 3/2009 | Hicks | 455/436 |
| 2010/0091963 A1 * | 4/2010 | Frey | 379/112.06 |
| 2010/0130169 A1 | 5/2010 | Narayanaswamy et al. | |
| 2011/0130168 A1 * | 6/2011 | Vendrow et al. | 455/556.1 |
| 2013/0040602 A1 * | 2/2013 | Piccinini et al. | 455/406 |
| 2013/0079059 A1 * | 3/2013 | Huslak | 455/558 |

* cited by examiner

*Primary Examiner* — Binh Tieu
(74) *Attorney, Agent, or Firm* — Crawford Maunu PLLC

(57) ABSTRACT

According to one or more embodiments, a telecommunication system includes a call routing circuit configured to receive and route calls and data transmissions from a plurality of telecommunication devices. The telecommunication system also includes a processing circuit for monitoring business and personal use of telecommunication devices associated with a client account. The processing circuit is configured to maintain a log of calls and data transmissions routed by the call-routing circuit for a the plurality of telecommunication devices. The processing circuit is further configured to use a set of classification functions in a policy of the client account to determine whether each of the identified first set of calls and data transmissions are business related or personal based on characteristics of each of the first set of calls and data transmissions.

20 Claims, 5 Drawing Sheets

US 8,948,358 B1

MONITORING OF PERSONAL AND BUSINESS USE OF TELEPHONY DEVICES

FIELD OF THE INVENTION

The present disclosure relates to call and data routing of communications originating from a telecommunication device.

OVERVIEW

Modern telephone networks may route phone calls between telecommunication devices (e.g., plain old telephones (POTS), internet protocol (IP) phones, voice over IP (VoIP) devices, computers, and/or mobile phones) over a combination of multiple phone and data networks owned by multiple carriers. For instance, phone calls may be routed over a combination of networks including: wired and cellular networks in the public-switched-telephone-network (PSTN), private telephony networks (e.g., a private branch exchange), and the internet. Phone calls are routed in and between networks by respective call-routing circuits (e.g., exchanges servers, private branch exchange servers, VoIP servers, and packet switches).

Carrier charges for communicating phone calls and data may vary greatly depending on a number of factors including, e.g., the networks used to route the call, source and destination telephone numbers, length of call, destination, and time of day. Charges can include per-call rates, per-minute rates, charges based upon the call origination/destination, and data rates. Many service providers offer package options with unlimited calling to certain areas, certain individuals or the like. These packages are often associated with increased periodic (e.g., monthly) fees. International calls are often subject to some of the highest rates, both for per call/minute rates and for monthly package-related fees. Fees may also be charged for specific services such as text messaging (e.g., short-message service or "SMS"), VoIP, and voice or video conferencing.

Businesses may incur fees for a large number of phone calls and data messages communicated from telecommunication devices owned by the business including, for example, desktop and laptop computers, POTS, IP phones, VoIP devices, and mobile phones. Due to the large number of communications fees and devices, it can be difficult for businesses to monitor and manage communications on these devices.

SUMMARY

Aspects of the present disclosure are directed to communications applications that address challenges including those discussed above, and that are applicable to a variety of applications, devices, systems and methods. These and other aspects of the present disclosure are exemplified in a number of implementations and applications, some of which are shown in the figures and characterized in the claims section that follows.

According to one or more embodiments, a telecommunication system includes a call routing circuit (e.g., an exchange server) configured to receive and route calls and data transmissions from a plurality of telecommunication devices. Each of the plurality of telecommunication devices has a respective identifier (e.g., a telephone number, a MAC address, and/or an IP address) that is unique to the telecommunication device. The system also includes a processing circuit for monitoring business and personal use of telecommunication devices associated with a client account. The processing circuit is configured to maintain a log of calls and data transmissions routed by the call-routing circuit and determine a first set of the calls and data transmissions corresponding to identifiers of the telecommunication devices that are associated with a client account. The processing circuit is further configured to use a set of classification functions in a policy of the client account to determine whether each of the identified first set of calls and data transmissions are business related or personal based on characteristics of each of the first set of calls and data transmissions. The processing circuit stores information indicating whether each of the first set of calls and data transmissions are business related or personal.

As more specifically applicable to voice over IP (VoIP) applications, in one or more embodiments, an apparatus includes a call routing circuit configured to route VoIP calls to and from a plurality of telecommunication devices having respective identifiers. The apparatus also includes a processing circuit configured to determine a first set of the VoIP calls corresponding to telecommunication devices that are associated with a client account in a database. The processing circuit uses a respective set of classification functions in a policy of the client account to determine and store data indicating whether each of the first set of VoIP calls are business related or personal based on characteristics of each of the first set of VoIP calls. The processing circuit is further configured to provide a web-based graphical user interface (GUI) for configuration of settings in a policy of a user account in response to input from an authorized user listed in the policy. In response to a first input from the authorized user, the GUI changes the telecommunication devices that are associated with the client account. In response to a second input from the authorized user, the GUI adjusts the set of classifications as directed by the authorized user.

Some embodiments may analyze calls for a plurality of client accounts using classification functions in a policy of respective policies stored in a database. For instance, in one or more embodiments, an apparatus is provided for monitoring calls routed by a VoIP call routing circuit on a telecommunication network. The apparatus includes a database storing respective polices for a plurality of client accounts and a processing circuit configured to detect VoIP calls routed by the VoIP call routing circuit. For each of the plurality of client accounts, the processing circuit determines a respective set of the VoIP calls corresponding to telecommunication devices associated with the client account in the corresponding policy. Using a respective set of classification functions in a corresponding policy of the client account, the processing circuit determines whether each of the set of VoIP calls are business related or personal based on characteristics of each of the set of VoIP calls.

The above summary is not intended to describe each illustrated embodiment or every implementation of the present disclosure.

BRIEF DESCRIPTION OF THE DRAWINGS

The invention may be more completely understood in consideration of the following detailed description of various embodiments of the invention in connection with the accompanying drawings, in which.

Figure 1:
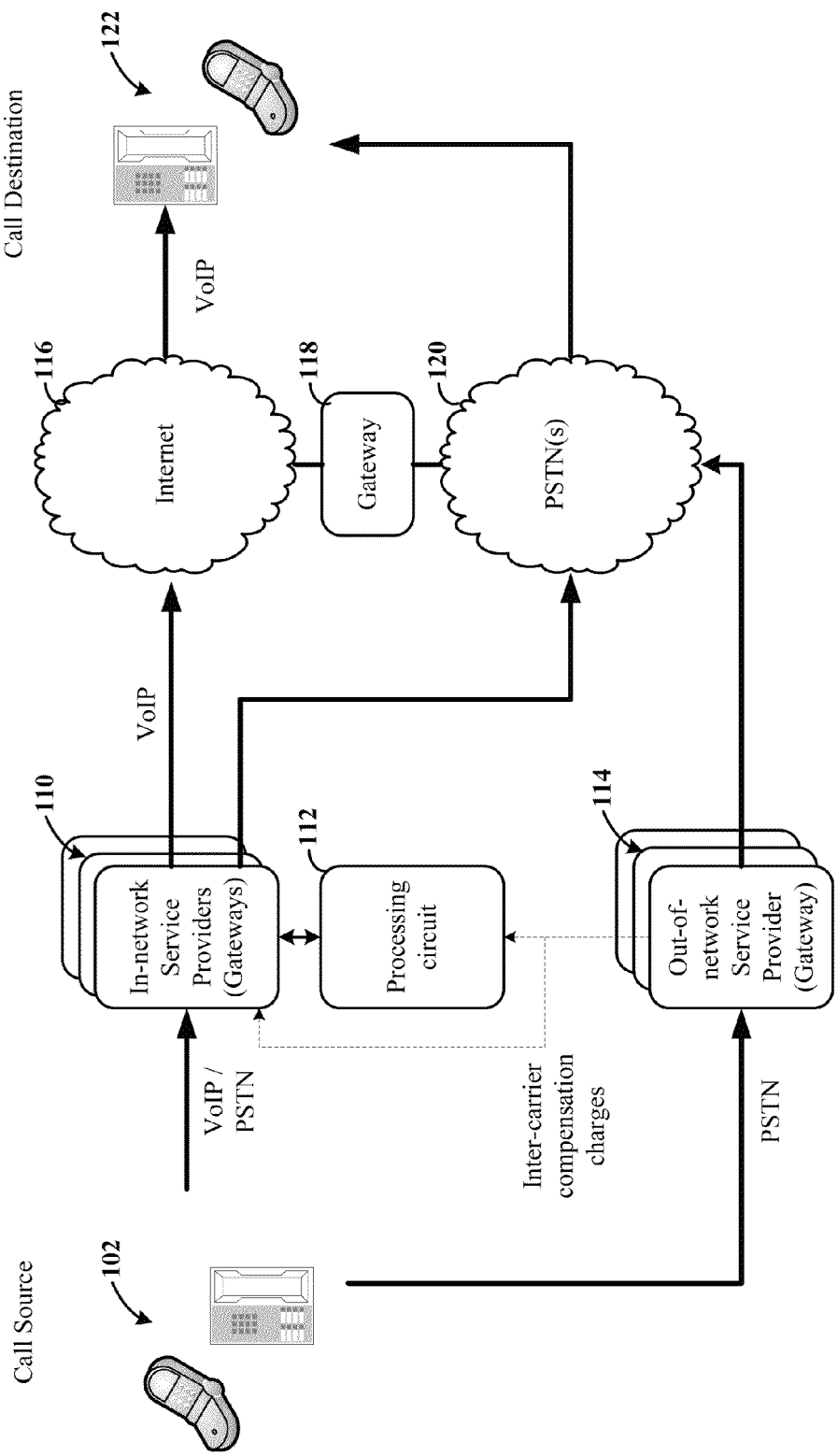
FIG. 1 shows a telecommunication system consistent with one or more embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure describes various systems and devices for monitoring calls and data routed over one or more networks. While the disclosed embodiments are not necessarily limited to such applications, various aspects of the present disclosure may be appreciated through a discussion of various examples using this context.

In some disclosed embodiments, a system is provided for monitoring business and personal use of telecommunication devices. The system includes one or more call-routing circuits configured to receive calls and data transmissions from telecommunication devices, and route the calls and data transmissions over one or more networks. The system includes at least one processing circuit for monitoring calls and data transmissions of the telecommunication devices. The processing circuit is configured to maintain a log of calls and data transmissions routed by the call-routing circuit and determine a first set of the calls and data transmissions corresponding to identifiers of the telecommunication devices that are associated with a client account. For instance, in one implementation, a list of telecommunication device identifiers associated with a client account may be stored in a database accessible by the processing circuit. The processing circuit is further configured to determine whether each of the identified first set of calls and data transmissions are business related or personal according to a set of classification functions in a policy of the client account. The classification functions identify business related calls and data transmissions based on various characteristics of calls and data transmissions (e.g., time of call, number of call, and/or location of telecommunication device).

Call-routing circuits, as described above, may be included in several different types of networks. For example, in some instances a call routing circuit routes calls and data transfers in a wired network or a cellular network in a PSTN. In some other instances, a call-routing circuit is a private branch exchange server (PBX) that routes calls and data transmissions in a private telephony network. The call routing circuits in the system are configured to route standard voice calls (e.g., over PSTNs) and/or route VoIP calls (e.g., over the internet).

The classification functions indicated in the policy of a client account may identify calls as business related or personal based on various characteristics of each communication. For instance, in some embodiments, business related and personal calls may be identified based on the geographic location at which the call is placed. For example, the geographic location of a mobile device may indicate whether an employee assigned the mobile device is at work or at home. Similarly, the geographic location of a telecommunication device using a fee-based service (e.g., video conferencing) may indicate whether use of the service is business related or personal.

In some implementations, the classification functions in a client policy determine whether a call or data transmission of a telecommunication device is business related or personal based on a determination whether a probable geographic location of the device, at the time of the call or data transmission, is within a designated business region indicated in the policy. For example, a designated business region may be defined by one or more ranges of GPS coordinates. As another example, a designated business region may be defined by a list of one or more private networks to which telecommunication devices located in the business region are connected. As yet another example, a designated business region may be defined by the presence of a combination of one or more cellular networks and/or WiFi access points.

In some embodiments, at least one telecommunication device is configured to receive calls at a first number and at a second number. The set of classification functions identify incoming calls to the first number as business use and identify incoming calls to the second number as personal. In some implementations, the classification functions further identify outgoing calls from the first number as business use and outgoing calls to the second number as personal.

In some embodiments, the classification functions in the policy of the client account identify calls as business use or personal based on a designated list of numbers indicated in the policy of the client account. For instance, in one embodiment, the classification functions identify calls as business related in response to the calls being outgoing calls to a number listed in a list of designated business numbers indicated in the policy. Similarly, the classification functions identify calls as business related in response to the calls being incoming calls from a number listed in the list of designated business numbers. In some embodiments, the processing circuit is configured to only log calls for devices having an identification number included in a list of devices to monitor in the policy of the client account.

In some embodiments, one or more classification functions in the policy of the client account identify a call as personal in response to the call including a metadata flag indicating the call is personal. For instance, in some implementations, a mobile device may be configured to flag calls with metadata indicating whether an outgoing call is to a number included in a designated personal contact list stored on the mobile device. Similarly, in some implementations, a mobile device may be configured to generate metadata indicating whether an outgoing call is to a number included in a designated business contact list stored on the mobile device. The designated contact list may be generated by an employee to which the mobile device is assigned, or may be a protected list provided to the phone from a policy when the mobile device is issued. In some embodiments, the designated contact list may be remotely updated by a manager of the client account. In some embodiments, the metadata is embedded in the outgoing call and is provided to the processing circuit by the routing circuit. In some other embodiments, the metadata is provided to the processing circuit from the mobile device via the internet.

In some embodiments, business related and personal calls are identified based on the time and/or date at which the call occurs. For instance, in some implementations, the classification functions in the policy of the client account identify business related and personal calls based on whether the call occurs at a time and/or day falling within a range indicated by a business schedule in the policy of the client account.

In some embodiments, the telecommunication system further includes an internet based graphical user interface (GUI) configured to provide a mechanism for an authorized manager of a client account to view and modify the policy associated with the client account. For instance, the GUI may allow a manager to adjust the policy settings for determining business and personal use company-wide or for particular telecommunication devices.

In some embodiments, the processing circuit is further configured to maintain a log of inter-carrier compensation charges received from a service provider. For example, inter-carrier compensation charges may be received for calls routed by the call routing circuit to a network owned by a different service provider. As another example, inter-carrier compensation charges may be received for calls placed on a cellular network of another service provider by mobile devices associated with a client account. Calls and data transactions corresponding to telephony devices having identifiers associated with the client account are logged by the processing circuit. The processing circuit uses a set of classification functions, indicated in the policy of the client account, to determine whether the logged inter-carrier charges are for business related use or personal use of the telephony devices. The processing circuit stores information indicating whether each of the inter-carrier compensation charges for the second set of calls and data transmissions are business related or personal.

As indicated above, some various embodiments are applicable to various different types of telecommunication services (e.g., standard voice calls, long-distance calls, SMS messages, VoIP calls, and/or voice or video conferencing services). However, for ease of explanation, examples may be primarily described with reference to routing VoIP calls in a telecommunication network. For instance, as more specifically applicable to VoIP applications, in one or more embodiments, an apparatus includes a call routing circuit configured to route VoIP calls to and from a plurality of telecommunication devices having respective identifiers. The apparatus also includes a processing circuit configured to determine a first set of the VoIP calls corresponding to telecommunication devices that are associated with a client account in a database. The processing circuit uses a respective set of classification functions in a policy of the client account to determine and store data indicating whether each of the first set of VoIP calls are business related or personal based on characteristics of each of the first set of VoIP calls. It is understood that various aspects of the examples described with reference to VoIP services may be applied to monitor/analyze other data communications (e.g., standard voice calls, long-distance calls, and/or SMS messages).

Similarly, for ease of explanation, the examples may be described by analysis of communication for telecommunication devices associated with a single account. It is understood that various embodiments may analyze communications for a plurality of different client accounts using respective policy settings (e.g., classification functions). In some embodiments, the respective policy settings may be individually configured by an authorized user(s) associated with the respective client account (e.g., in the respective policy).

Turning now to the figures, FIG. 1 shows a telecommunication system for communicating phone calls and/or data from a source device to a destination device. The source devices 102 and destination devices 122 shown in FIG. 1 are each one of a plurality of different types of telecommunication devices including, e.g., mobile devices, POTS, and/or IP-phones. Phone calls are routed from source devices 102 to destination devices 122 by one of a plurality of service providers (110, 114) available to the source devices 102. For example, in some embodiments, each of the in-network service providers 110 includes a respective call-routing circuit (not shown), which is configured to route calls received from a source device 102 over one or more networks (e.g., PSTN networks 120 and/or the internet 116) to an applicable one of the destination devices 122. In the example shown in FIG. 1, one or more of the in-network service providers 110 are configured to route standard voice calls over one or more PSTN networks 120. One or more of the in-network service providers 110 are configured to route VoIP calls over the internet 116. VoIP calls to VoIP devices may be routed, for instance, over the internet 116 directly to a destination VoIP device. VoIP calls to non-VoIP devices (e.g., POTS) may be routed, for instance, over the internet 116 to a gateway 118 in the location of a destination VoIP device. The gateway 118 completes the VoIP call by routing the call as a standard voice call over one or more PSTN networks to a destination device 122.

The system includes a processing circuit 112 for monitoring business and personal use of telecommunication devices associated with a client account. In some embodiments, the processing circuit is configured to identify calls and data transmissions from ones of the source devices 102 associated with a client account that are routed by one or more of the in-network service providers 110. In some implementations, the processing circuit 112 is configured to maintain a log of the calls and data transmissions identified on each of the in-network service providers 110. In some other embodiments, the system may include multiple processing circuits (e.g., 112), each configured to maintain a log of calls and data transmissions of a respective set of the in-network service providers 110. The processing circuit(s) 112 may be implemented externally to the in-network service providers (as shown in FIG. 1) or may be part of one of the in-network service providers 110.

In some embodiments, an in-network service provider 110 may contract with an out-of network service provider 114 to route calls of ones of the telecommunication devices associated with a client account. For instance, calls from a mobile device associated with a client account of an in-network service provider 110 may be placed on a cellular tower operated by the out of network service provider 114. In such a scenario, the out-of-network service provider may submit inter-carrier-compensation charges to the in-network service providers 110 or the processing circuit 112 for the call. Similarly, inter-carrier compensation charges may be received for phone calls forwarded by the in-network service providers to ones of the PSTNs operated by an out-of-network service provider. In some embodiments, the processing circuit 112 is configured to also maintain a log of inter-carrier compensation charges corresponding to a telecommunication device associated with the client account.

The processing circuit 112 is further configured to analyze the identified calls and data transfers from telecommunication devices associated with a client account to determine if the calls and data transfers are for business use or personal use. Knowledge of whether calls are for business use or personal use may be useful for a number of applications. For instance, identification of business use or personal calls may be helpful to allocate resources to certain departments or employees or for conducting employee reviews. As another example, it may be convenient to provide a separate accounting of business and personal charges so an employee may be charged for personal use of a company-issued telecommunication device. For instance, regarding mobile phones, employees could avoid the need to carry multiple mobile phones (e.g., for business and personal use) or submit complicated expense reports for personal use of a company-issued phone or for business use of an employee owned phone.

As indicated above, the processing circuit is configured to determine whether calls and data transfers are business use or personal use using number of different classification functions indicated in a policy of a client account. In some implementations, the classification functions in a client policy determine whether a call or data transmission of a telecommunication device is business related or personal based on a probable geographic location of the device at the time of the call or data transmission. For instance, various characteristics of a phone call or data transfer may indicate whether a telecommunication device is located within or outside of a designated business region indicated in a policy of a customer account. Such characteristics are discussed with reference to FIG. 2, which shows a telecommunication network including a business location 220 and a residential location 240 consistent with one or more embodiments of the present disclosure.

Figure 2:
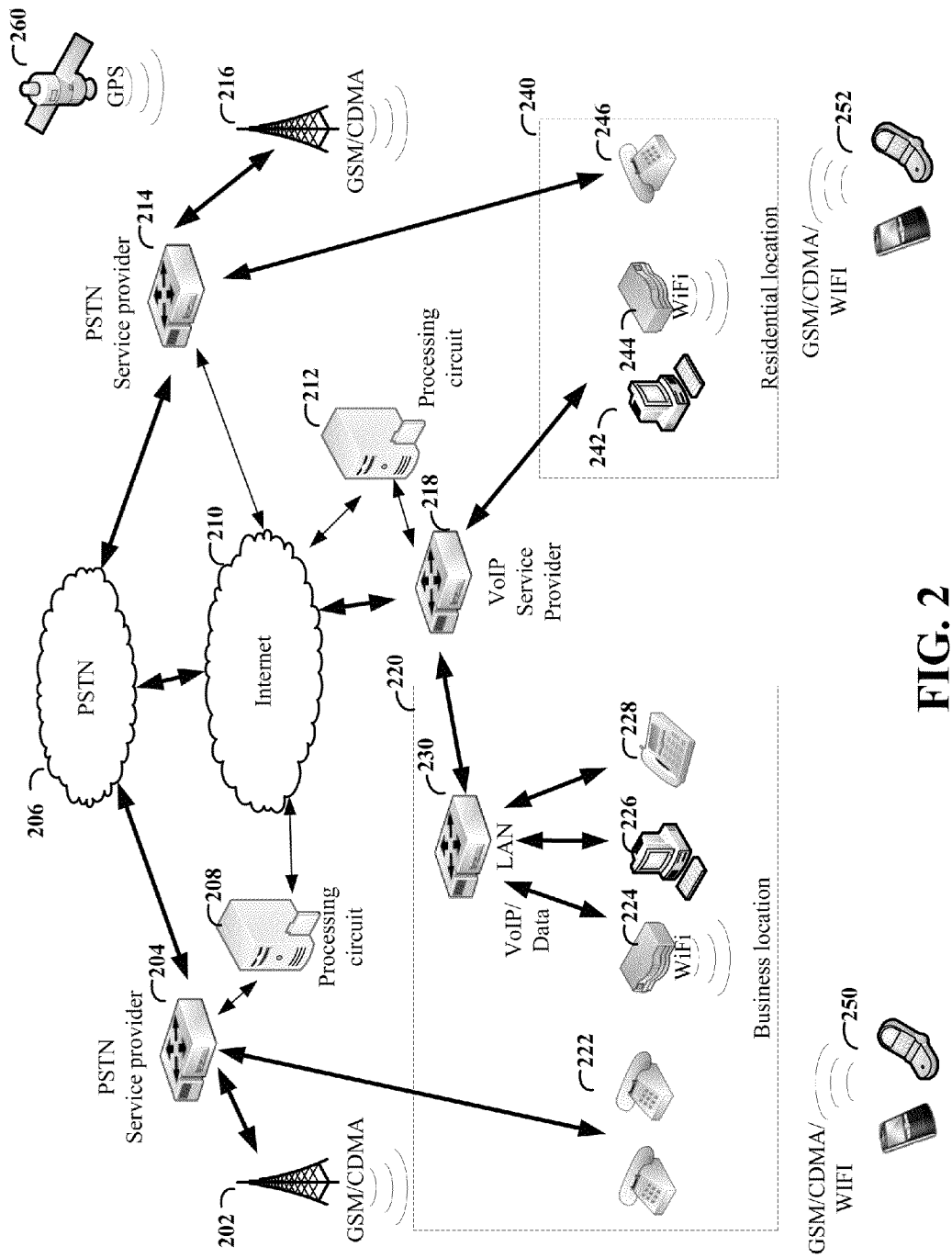
FIG. 2 shows a telecommunication system including a business location and a residential location consistent with one or more embodiments of the present disclosure.

The business location 220 and residential location 240 in FIG. 2 each include respective POTS 222/246, which place and receive phone calls to PSTN service providers 204/214 in the respective locations. Each of the locations in this example also includes a respective cellular network 202/216, which provides phone calls from mobile devices 250/252 in the respective location to the PSTN service provider 204/214 in the respective location. The PSTN service providers route calls via one or more PSTNs 206. In this example, each of the locations further includes devices and circuits (e.g., WiFi access points 224/242 and LAN 230) to route VoIP calls from VoIP enabled devices (e.g., mobile devices 250/252 computers 226/242, and IP phones 228) to a VoIP service provider 218. As discussed with reference to FIG. 1, the VoIP service provider 218 routes VoIP calls over the one or more networks including the internet 210 and possibly over one or more PSTNs 206.

Processing circuits 208/212 are configured to analyze calls routed by the PSTN service providers 204/214 and/or VoIP service provider 218 to determine if the calls are business use or personal use. As indicated above, in some embodiments, the processing circuits 208/212 are each configured to determine whether calls are business use or personal use by using a number of different classification functions. In some implementations, the classification functions in a client policy determine whether a call or data transmission of a telecommunication device is business related or personal based on a probable geographic location of the device at the time the call or data transmission. As one example, the probable geographic location of a telecommunication device used to place a call may be determined based on the particular service provider 204/214 or cellular network 202/216 used to place a call. In the example shown in FIG. 2, if a call is placed with PSTN service provider 204 or cellular network 202, it is likely that the telecommunication device used to place the call is located at the business location 220.

In some embodiments, various characteristics of a geographic location can be measured by a device (e.g., mobile devices 250/252) and provided to the processing circuits 208/212 as metadata in the phone call or in a separate data packet. For instance, presence of WiFi Access points 224/244 or cellular networks 202/216 may be used to determine probable geographic location of a telecommunication device. As another example, telecommunication devices may be configured to determine a probable geographic location based on GPS signals received from GPS satellites 260 at the geographic location of the telecommunication device.

Some classification functions in a client policy determine whether a call or data transmission of a telecommunication device is business related or personal based on characteristics other than probable physical location. For instance, the time of day or day of the week may indicate whether a call is made during scheduled business hours indicated in a policy of the client account. As another example, designated lists of business and/or personal telephone numbers may be used to indicate whether phone calls are for business or for personal use.

Figure 3:
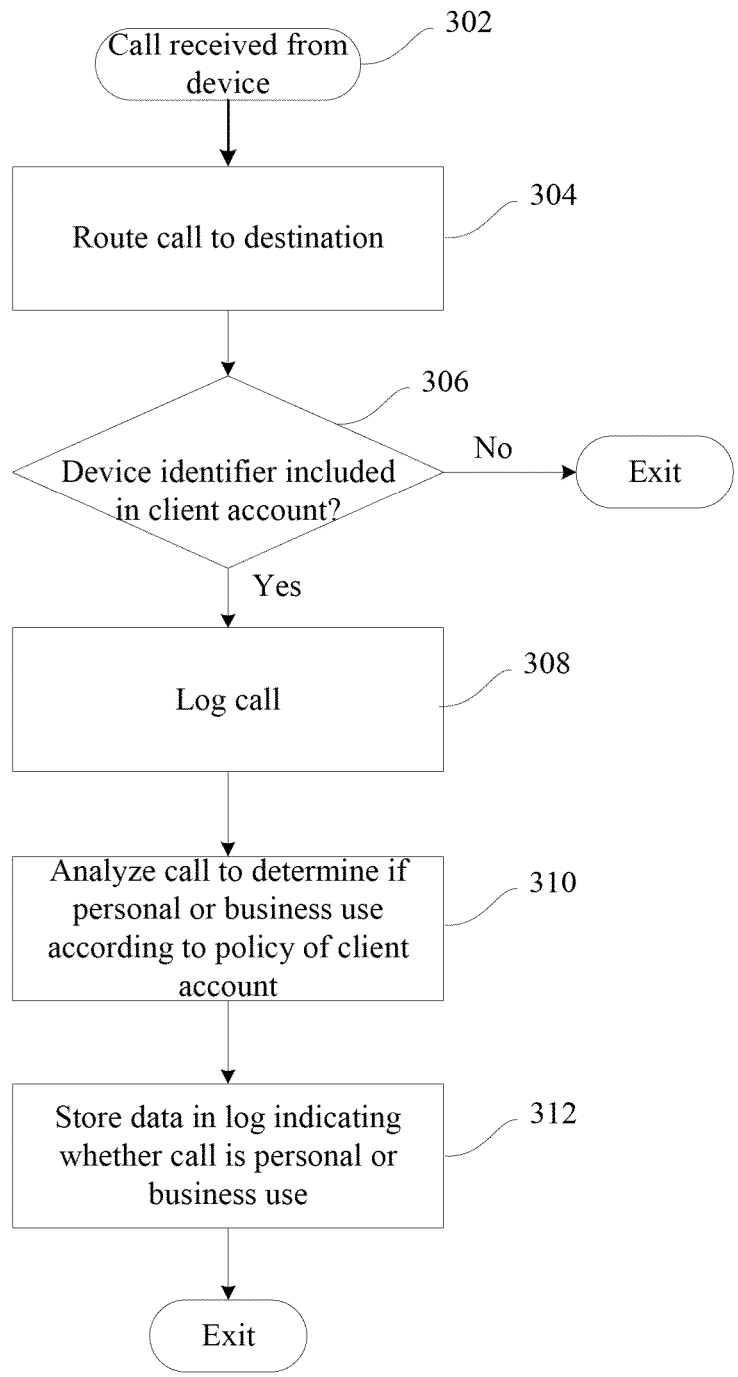
FIG. 3 shows a method of processing calls consistent with one or more embodiments of the present disclosure.

FIG. 3 shows a method for processing calls consistent with one or more embodiments of the present disclosure. In response to receiving a call 302 (e.g., at a service provider), the call is routed to its destination at block 304 (e.g., routed by a call routing circuit). If a device identifier of the call source is not included in a client account at decision block 306, the process exits. As discussed above, in some embodiments only calls from a subset of telecommunication devices of a client account listed in a policy are analyzed. In some other embodiments, all telecommunication devices associated with a client account are analyzed. If a device identifier indicates a telecommunication device to be monitored, the call is logged at block 308. The call is analyzed at block 310 to determine if the call is business use or personal use according to the policy of a client account. For instance, as discussed above, the policy of a client account may include a number of classification functions to determine whether calls and/or data use are business use or personal use. At block 312, data is stored in a log indicating whether the call is personal use or business use.

Figure 4:
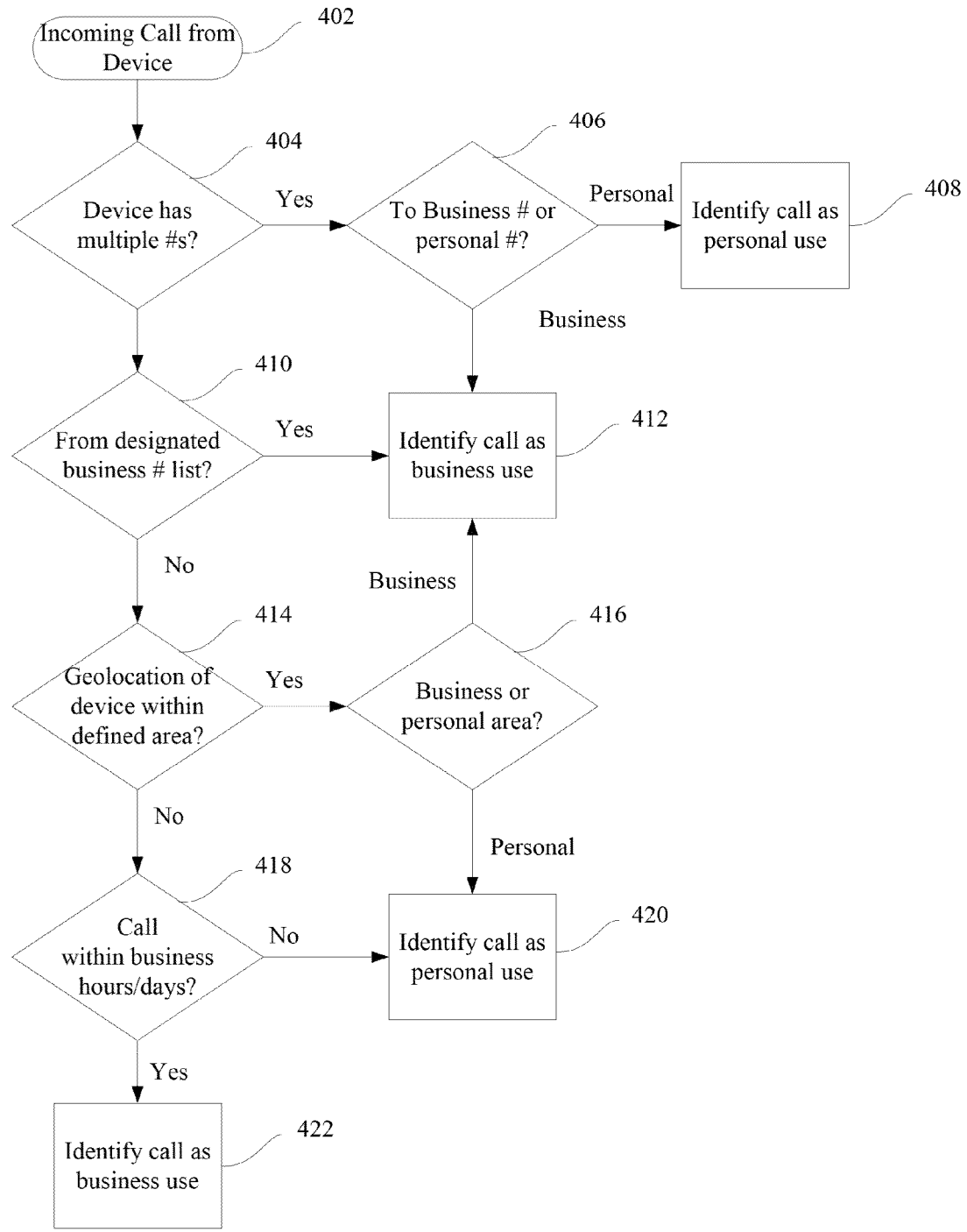
FIG. 4 shows an example process for determining whether an incoming call to a telecommunication device is business related or personal.
Figure 5:
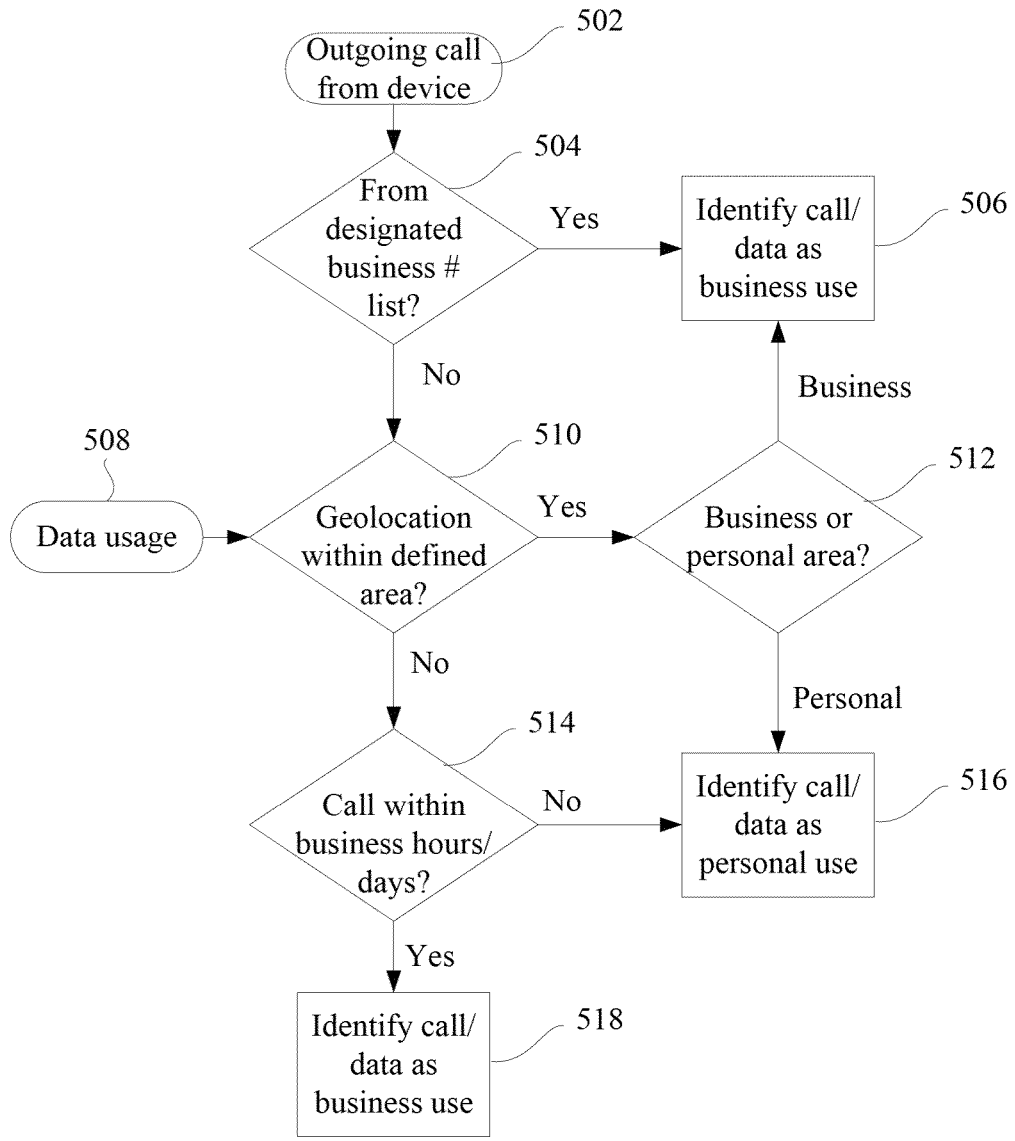
FIG. 5 shows an example process for determining whether outgoing calls and data use of a telecommunication device are business related or personal.

FIGS. 4 and 5 show two example processes for determining whether calls to and from a telecommunication device are business use or personal use. As illustrated therein, several different characteristics may be used to determine if calls and data transfers are business use or personal use. FIG. 4 shows an example process for determining whether an incoming call to a telecommunication device is business related or personal. As indicated above, in some embodiments, some telecommunication devices are assigned multiple telephone numbers to place and receive calls. For instance, an employer-provided mobile device may be configured to receive at a first telephone number (intended for business use) and at a second telephone number (intended for personal use). In response to an incoming call 402 from a telecommunication device, the example process in FIG. 4 determines if the telecommunication device is assigned multiple numbers at decision block 404. If the telecommunication device is assigned multiple numbers, and the incoming call is to a designated personal number at decision block 406, the call is identified as personal use at block 408. Otherwise, if the incoming call is to a designated business number at decision block 406, the call is identified as business use at block 412.

If the telecommunication device does not include multiple numbers at decision block 404, the call may be identified as business use or personal use based on designated contact lists at decision block 410. For instance, a list of designated business numbers may be listed in a policy of a client account. As one example, the list of designated business numbers may include all numbers in the company directory. In some embodiments, the list of designated business numbers could be supplemented to include numbers outside of a company directory. For instance, in some implementations, the list of designated business numbers may be supplemented by employees though an IP phone interface or web interface. In some implementations, numbers submitted by employees may be flagged for supervisory review to verify that the numbers are not for personal use. As another example, the list of designated business numbers may be automatically updated by an email client (e.g., MS Outlook) plugin to add contact numbers listed in emails received by employees. It is recognized that numbers may be added to a designated contact list using a number of other mechanisms and interfaces as well. If the call is determined to be from a number included in the designated business contact list at decision block 410, the call is identified as business use at block 412.

Although not shown in FIG. 4, a similar approach may be used to identify personal incoming calls using a designated personal contact list of an employee. For instance, a company-issued mobile phone may be configured to send metadata (indicating a call is personal use) to the processing circuit in response to the number of the call being included in a personal contact list stored on the mobile phone.

If the call is not included in a designated business contact list at decision block 410, the process shown in FIG. 4 attempts to categorize the call based on geolocation of the device at decision block 414. As discussed above, in some embodiments a call can be identified as business use or personal based on whether a telecommunication device is located within a designated business region at the time of a call. As discussed with reference to FIG. 2, a number of characteristics may indicate that a device is located within a designated business region including: GPS coordinates, presence of certain WiFi access points, presence of certain cellular networks, etc.

A designated business location may be specific to a number of city blocks within which company buildings are located. Alternatively or additionally, a designated business location may be broadly defined to include the area outside of an employee's state of residence. For instance, use of a company-issued phone outside of the state of residence may indicate that the employee is traveling on business. Geographical characteristics may similarly indicate if a telecommunication device is in a designated personal location. For instance, an account manager could designate an "entertainment district" of a city as a designated personal location. If the telecommunication device is determined to be within a designated business area at decision blocks 414 and 416, the call is identified as business use at block 412. If the device is determined to be within a designated personal area at decision blocks 414 and 416, the call is identified as personal use at block 420.

If the geolocation of the device is not within a defined area at decision block 414, the process in FIG. 4 categorizes the call based on time of day and/or day of week. As indicated above, designated business hours and days may be indicated in a schedule in a policy of the client account. If the time/day of the call is within designated business hours/days indicated by a policy at decision block 418, the call is identified as business use at block 422. Otherwise, the call is identified as personal use at decision block 420.

FIG. 5 shows an example process for determining whether outgoing calls and data use of a telecommunication device are business use or personal use. As discussed with reference to FIG. 4, in some embodiments, some telecommunication devices are assigned multiple devices to place and receive calls. In response to an outgoing call from a device 502, the example process in FIG. 5 determines if the call is from a designated business number of the device at decision block 504. If the call is from a designated business number at decision block 504, the call is identified as business use at block 506.

If the call is not from a designated business number at decision block 504 (e.g., if the device does not support multiple numbers), or in response to data transfer, the process in FIG. 5 identifies outgoing calls 502 and/or data use 508 as business or personal use based on geolocation of the device. As discussed above for incoming calls with reference to FIG. 4, outgoing calls and data usage are identified as business use or personal based at decision block 510 based on whether a telecommunication device is located within a designated area at the time of a call. As discussed with reference to FIGS. 2 and 4, a number of characteristics may indicate that a telecommunication device is within a designated region including: GPS coordinates, presence of certain WiFi access points, presence of certain cellular networks, etc. If the telecommunication device is determined to be within a designated business area at decision blocks 510 and 512, the call/data usage is identified as business use at block 506. If the telecommunication device is determined to be within a designated personal area at decision blocks 510 and 512, the call is identified as personal use at block 516.

If the geolocation of the telecommunication device is not within a defined area at decision block 510, the process in FIG. 5, categorizes the call based on time of day. As indicated above, designated business hours and days may be indicated in a schedule in a policy of the client account. If the time/day of the call is within designated business hours/days indicated by a policy at decision block 514, the call is identified as business use at block 518. Otherwise, the call is identified as personal use at decision block 516.

The telecommunication devices of a client account, designated numbers, designated geographic regions, and business hours/days, and other criteria of classification functions of a policy may be adjusted by an account manager via various configuration interfaces. Another aspect of the present disclosure relates to the use of a configuration interface, such as a website, that allows a user to configure settings in a policy of a client account. For instance, in some embodiments, the telecommunication system further includes a web-based GUI configured to provide a mechanism for an authorized manager of a client account to view and modify the policy associated with the client account. For instance, the GUI may allow a manager to adjust the policy settings for determining business and personal use company-wide or for particular telecommunication devices, employees, and/or departments. In some implementations, the web-based interface allows a client manager to generate reports indicating the identified business and personal usage. Reports may be generated company-wide or for specific devices, employees, or departments. Similarly, reports may be generated for aggregate use of all services or may be generated individually for individually services (e.g., standard voice calls, long-distance calls, SMS messages, VoIP calls, and/or voice or video conferencing).

The various embodiments as discussed herein may be implemented using a variety of structures and related operations/functions. For instance, one or more embodiments as described herein may be computer-implemented or computer-assisted, as by being coded as software within a coding system as memory-based codes or instructions executed by a computer processor, microprocessor, PC or mainframe computer. Such computer-based implementations are implemented using one or more programmable circuits that include at least one computer-processor and internal/external memory and/or registers for data retention and access. One or more embodiments may also be implemented in various other forms of hardware such as a state machine, programmed into a circuit such as a field-programmable gate array, implemented using electronic circuits such as digital or analog circuits. In addition, various embodiments may be implemented using a tangible storage medium that stores instructions that, when executed by a processor, performs one or more of the steps, methods or processes described herein (e.g., the processor is configured via the instructions). These applications and embodiments may also be used in combination; for instance, certain functions can be implemented using discrete logic (e.g., a digital circuit) that generates an output that is provided as an input to a processor.

The various embodiments described above are provided by way of illustration only and should not be construed to limit the invention. Based upon the above discussion and illustrations, those skilled in the art will readily recognize that various modifications and changes may be made without strictly following the exemplary embodiments and applications illustrated and described herein. For instance, although implementations may in some cases be described in individual figures, it will be appreciated that features from one figure can be combined with features of another figure even though the combination is not explicitly shown or explicitly described as a combination. It is intended that the specification and illustrated embodiments be considered as examples only, with a true scope of the invention being indicated by the following claims.

What is claimed is:

1. A telecommunication system, comprising:
a call-routing circuit configured and arranged to receive and route calls and data transmissions from a plurality of telecommunication devices, each telecommunication device having a respective identifier; and
a processing circuit, configured and arranged to:
log calls and data transmissions routed by the call-routing circuit;
determine a first set of the calls and data transmissions corresponding to identifiers of the telecommunication devices that are associated with a client account in a database;
using a respective set of classification functions in a policy of the client account, determine whether each of the first set of the calls and data transmissions are business related or personal based on a determination of whether a geographic location of the device, at a time of the call or data transmission, is within a designated business region indicated in the policy; and
store information indicating whether each of the first set of the calls and data transmissions are business related or personal.

2. The telecommunication system of claim 1, wherein:
the processing circuit is configured to route voice-over IP (VoIP) calls to and from the plurality of telecommunication devices; and
the processing circuit is further configured to provide an internet-based graphical user interface (GUI) configured and arranged to adjust the set of classification functions in the policy of the client account in response to input from an authenticated user listed in the policy of the client account.

3. The telecommunication system of claim 1, wherein the processing circuit is configured and arranged to:
route voice-over IP (VoIP) calls to and from the plurality of telecommunication devices;
log inter-carrier compensation charges received from a service provider for a second set of VoIP calls, which correspond to telephony devices having identifiers associated with the client account and were routed by the service provider;
using the set of classification functions in the policy of the client account, determine whether each of the second set of VoIP calls are business related or personal; and
store information indicating whether each of the inter-carrier compensation charges for the second set of VoIP calls are business related or personal.

4. The telecommunication system of claim 1, wherein:
at least one of the telecommunication devices that are associated with the client account is configured and arranged to, at a time when the telecommunication device is connected to a cellular network, receive calls at a first number and at a second number; and
the set of classification functions identify incoming calls to the first number as business related and incoming calls to the second number as personal.

5. The telecommunication system of claim 4, wherein:
the set of classification functions identify outgoing calls from the first number as business related and outgoing calls from the second number as personal.

6. The telecommunication system of claim 1, wherein:
the set of classification functions identify calls as business related in response to the calls being outgoing calls to a number listed in a set of designated business numbers indicated in the policy; and
the set of classification functions identify calls as business related in response to the calls being incoming calls from a number listed in the set of designated business numbers.

7. The telecommunication system of claim 1, wherein the processing circuit is configured and arranged to log calls and data transmissions routed by the call-routing circuit, only in response to the respective identifier being included in a list of devices to monitor in the policy of the client account.

8. The telecommunication system of claim 1, wherein the set of classification functions identify a call as personal in response to the call including a metadata flag indicating the call is personal.

9. The telecommunication system of claim 1, wherein:
the set of classification functions identify a call from one of the plurality of telecommunication devices as business related in response to the call including a metadata flag having a first value indicating the call is to a number included in a first contact list stored on the telecommunication device; and
the set of classification functions identify a call from one of the plurality of telecommunication devices as personal in response to the metadata flag having a second value indicating the call is to a number included in a second contact list stored on the telecommunication device.

10. The telecommunication system of claim 1, wherein:
the set of classification functions identify a call as business related in response to the call occurring at a time of day within a designated business time range indicated in the policy.

11. The telecommunication system of claim 1, wherein the set of classification functions in the policy determine whether a call from one of the plurality of telecommunication devices is business related or personal based on metadata provided to the processing circuit from the call-routing circuit.

12. The telecommunication system of claim 1, wherein the set of classification functions in the policy determine whether a call from one of the plurality of telecommunication devices is business related or personal based on metadata provided to the processing circuit from the one of the plurality of telecommunication devices.

13. The telecommunication system of claim 1, wherein the telecommunication device is configured and arranged to determine the geographic location of the telecommunication device based on a presence of WiFi Access points and presence of cellular networks.

14. An apparatus, comprising:
- a call routing circuit configured and arranged to route voice-over IP (VoIP) calls to and from a plurality of telecommunication devices having respective identifiers; and
- a processing circuit, configured and arranged to:
  - determine a first set of the VoIP calls corresponding to identifiers of the telecommunication devices that are associated with a client account in a database;
  - using a respective set of classification functions in a policy of the client account, determine whether each of the first set of VoIP calls are business related or personal based on characteristics of each of the first set of VoIP calls;
  - store information indicating whether each of the first set of VoIP calls are business related or personal; and
  - provide a web-based graphical user interface (GUI) configured to
    - in response to a first input from an authorized user listed in the policy of the client account, change which telecommunication devices are associated with the client account, and
    - in response to a second input from the authorized user listed in the policy of the client account, adjust the set of classification functions to be used to determine whether VoIP calls to and from the telecommunication devices associated with the client account are business related or personal.

15. The apparatus of claim 14, wherein the web-based GUI is further configured to, in response to a third input from the authorized user listed in the policy of the client account, provide a report indicating whether each of the first set of VoIP calls are business related or personal.

16. The apparatus of claim 15, wherein:
- at least one of the set of classification functions determines whether a VoIP call to or from a telecommunication device is business related or personal based on an IP address assigned to the corresponding telecommunication device at a time of the VoIP call;
- at least one of the set of classification functions determines whether a VoIP call to or from a telecommunication device is business related or personal based on a time at which the VoIP call is placed; and
- at least one of the set of classification functions determines whether a VoIP call to or from a telecommunication device is business related or personal based on a source number and a destination number of the VoIP call.

17. The apparatus of claim 14, wherein at least one of the set of classification functions determine whether a VoIP call to or from a telecommunication device is business related or personal based on a determination of whether a probable geographic location of the device at a time of the call or data transmission is within a designated business region indicated in the policy.

18. The apparatus of claim 14, wherein the processing circuit is further configured to:
- log inter-carrier compensation charges received from a service provider for a second set of VoIP calls, which correspond to telephony devices having identifiers associated with the client account and were routed by the service provider;
- using the set of classification functions in the policy of the client account,
- determine whether each of the second set of VoIP calls are business related or personal; and
- store information indicating whether each of the inter-carrier compensation charges for the second set of VoIP calls are business related or personal.

19. The apparatus of claim 18, wherein at least one of the set of classification functions identifies a call as business related in response to the service provider flagging the call as personal.

20. An apparatus for monitoring calls routed by a voice-over IP (VoIP) call routing circuit on a telecommunication network, the apparatus comprising:
- a database storing respective policies for a plurality of client accounts;
- a processing circuit configured and arranged to:
  - detect VoIP calls routed by the VoIP call routing circuit; and
  - for each of the plurality of client accounts,
    - determine a respective set of the VoIP calls corresponding to telecommunication devices associated with the client account in the corresponding policy,
    - using a respective set of classification functions in a policy of the client account, determine whether each of the set of VoIP calls are business related or personal based on characteristics of each of the set of VoIP calls, and
    - store information indicating whether each of the set of VoIP calls are business related or personal.

* * * * *